UNITED STATES PATENT OFFICE.

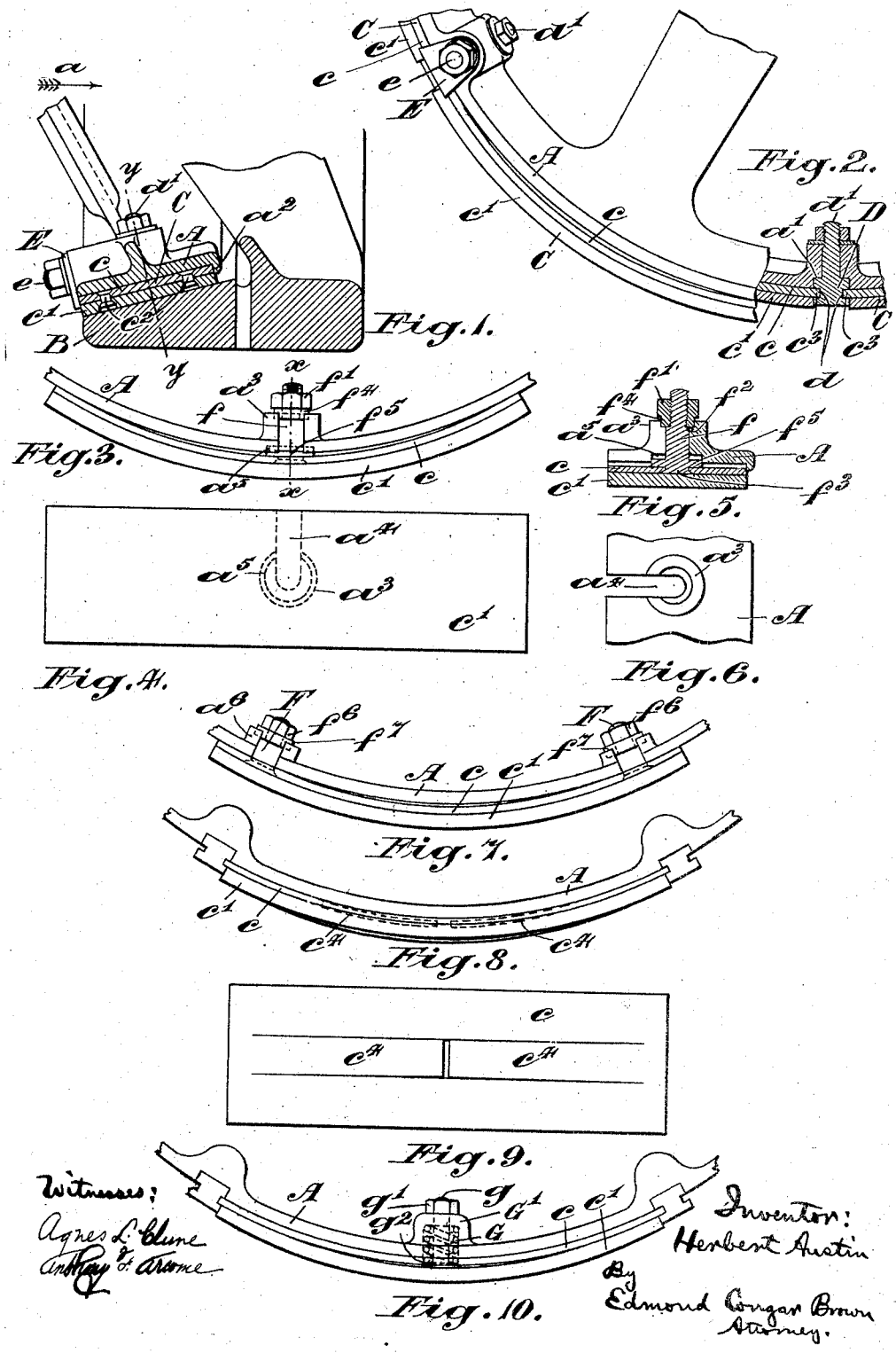

HERBERT AUSTIN, OF BARNT GREEN, NEAR BIRMINGHAM, ENGLAND.

FRICTION-CLUTCH HAVING REMOVABLE WEARING-SURFACES.

1,020,737.  Specification of Letters Patent.  Patented Mar. 19, 1912.

Application filed June 1, 1909. Serial No. 499,430.

*To all whom it may concern:*

Be it known that I, HERBERT AUSTIN, a subject of the King of Great Britain, residing at Barnt Green, near Birmingham, in the county of Warwick, England, engineer, have invented certain new and useful Improvements in Friction-Clutches Having Removable Wearing-Surfaces, of which the following is a specification.
This invention relates to the type of conical friction clutch in which the slipping and clutching surface of one of the members is adapted to be removed in sections when worn and replaced by a fresh surface.
Broadly describing the main feature of this invention, it consists in dividing the removable wearing surface into a number of separate sections which are supported by the conical surface of the clutch part and each of which comprises a thin metallic backing-plate having at its outer face flexible or yielding material, such for instance as leather, woven fabric, or the like, or being itself faced with a metal or alloy which is softer than such plate, which provides the wearing surface, and these sections, when in place, follow one another around the surface of the clutch member by which they are carried, each section being preferably of such length only as, having regard to the conical shape of the member by which it is to be carried, will allow it to be pushed into place between the two clutch members when these are in their normal out-of-clutch position in relation to one another or otherwise as far out of clutch as they can be without disturbing their connections with the mechanism in respect of which they are used, and in means by which such sections may then be removably fixed in place.

The invention may be applied either to the wearing surface around the inner clutch member or the wearing surface of the interior of the outer clutch member.
In its application, the invention may be varied considerably in detail; and, in order that it may be readily understood, we will now describe certain practical applications thereof which are illustrated, by way of example, by the drawings herewith, of which;

Figure 1 is a transverse section (that is to say, a section whose plane is radial to the axis of the clutch) through the rims of the inner and outer members of a clutch. Fig. 2 is an elevation, partly in section on line $yy$ of Fig. 1, of the inner rim shown by Fig. 1, as the same would appear looked at in the direction of the arrow $a$ of such figure. Fig. 3 is an elevation of a short length of inner rim of a clutch, showing a method of limiting the outward spring of a section, which may be utilized also in a modified form of fastening a section to the rim. Fig. 4 is an outer or wearing face view of the section shown by Fig. 3, showing a boss, slot and recess of the rim, by broken lines. Fig. 5 is a transverse section taken on line $xx$ of Fig. 3. Fig. 6 is an inner face view of a short length of the inner rim shown by Figs. 3 and 5, where a bolt for limiting the outward spring of the section passes through. Fig. 7 is a corresponding view to Fig. 3, showing a further form of fastening a section to the rim. Fig. 8 is a corresponding view to Fig. 3, showing a form of the invention in which a section is fixed in the manner shown by Figs. 1 and 2, but is itself formed with elastic tongues for the purpose hereinafter shown. Fig. 9 is a face view of the section shown by Fig. 8, with the outer cover, forming the wearing surface, removed, and; Fig. 10 is a view corresponding to Fig. 8, showing the outer cover to be pressed outward at the middle by a spring device.
Referring first to Figs. 1 and 2, A is the inner clutch rim and B the outer. A number of sections C follow one another in succession around the conical rim A, and are carried thereby. The outer faces of these sections constitute the surfaces which frictionally clutch with the conical inner surface of the rim B, and the sections are each of such length only as will permit, when the clutch parts are as far out of clutch as they can be moved, in ordinary use, or otherwise, without disturbing their connections with the mechanism, of their readily, when unfastened, being withdrawn from between the conical surfaces of the rims A and B and replaced by fresh sections. Each section consists of a steel sole or backing plate $c$ which forms a foundation, and of a facing $c^1$ of leather, woven fabric, or the like, which is fastened thereto, such as by rivets $c^2$. Each sole-plate $c$ projects at each end somewhat beyond the facing $c^1$, and in putting a section into place these projecting ends $c^3$ are slipped along within grooves $d$ of transverse strips D which are let into transverse grooves $a^1$ of the rim A and are held therein by pins $d^1$. The sections are pushed up against a flange $a^2$ formed around the inner edge of the rim A, and are prevented from slipping back within the grooves $d$ by washers E each of which passes across the outer edges at the adjacent ends of two plates $c$ and is itself fixed to the rim A by a bolt $e$. If, as is usually the case, portions of the wearing surface of one member of the clutch are desired to spring out beyond other portions thereof, when the members of the clutch are out-of-clutch, in order that portions of the surface may yield gradually as the clutch parts are brought together, with the result that the frictional grip may come gradually into play, each plate $c$ may be adapted to spring out somewhat at the middle when free to do so, and in Fig. 2 the plate, of which the full length is illustrated, is shown to have sprung out in this manner. The outward spring may be definitely limited, conveniently in the manner presently described.

The remaining views are of a somewhat diagrammatic form, for the sake of simplicity and convenience of illustration, the conical surfaces being shown as if cylindrical.

Referring now to Figs. 3 to 6, inclusive, the sole-plate $c$ has a bolt $f$ at its middle, which passes through the rim A and has a nut $f^1$ on its inner end which is screwed up against a shoulder $f^2$ of the bolt. This nut prevents the sole-plate from springing out beyond a predetermined distance. The bolt is conveniently connected with the sole-plate by forming it with a countersunk head $f^3$ which is let into a countersunk hole of the sole-plate, and a boss $a^3$ is formed at the inner side of the rim A to strengthen the rim where the bolt $f$ passes through. To enable the sole-plate carrying the bolt $f$ to be pushed into position across the outer face of the rim A, the hole through the rim and boss through which the bolt $f$ passes is slotted out to the outer edge of the rim, as clearly shown at $a^4$ Fig. 6. If the sole-plate $c$ has its ends slid within grooves in the manner described with reference to Figs. 1 and 2, the nut $f^1$ may be utilized to insure that the plate will not slip outward within the grooves, even if the washers E above described are dispensed with, in which case the nut is formed with a washer $f^4$ at its inner face, which fits within a corresponding sinking in the face of the boss $a^3$, this sinking being of such depth that, when the plate has been pressed back at its middle against the rim A, the washer will still be partially within the recess, thus preventing the bolt from moving outward along the slot $a^4$, and consequently preventing the middle of the plate from moving sidewise. The washer $f^4$ may be made separate from the nut, if desired. A collar $f^5$ surrounds the bolt immediately at the back of the plate and forms in effect the back head of the rivet by which the bolt is fixed to the plate, and this collar fits within a corresponding recess $a^5$ in the outer face of the rim A, and is of such thickness only as will allow it to be passed in with the section. The collar $f^5$ is however always some distance within the recess $a^5$ when the nut $f^1$ has been screwed up against the shoulder $f^2$ of the bolt $f$. The use of the bolt $f$, in the manner described, permits also of the ends of the sole-plate $c$ being free, if desired.

Referring now to Fig. 7, the sole-plate $c$ is shown as simply fixed near its ends by two bolts F, which correspond with the bolt $f$ shown by Figs. 3 and 5 except that the sole-plate is firmly held at each end against the rim A by the bolts, respectively. These bolts are passed into place with the sole-plate, being moved along within slots of the rim A similarly as the bolt $f$ is moved into place. In order to prevent the sole-plate from slipping out sidewise, the nut $f^6$ of each bolt F may be formed with a washer $f^7$ which enters a recess in the corresponding boss $a^6$ similarly as the washer $f^4$ of the nut $f^1$ enters within the recess of the boss $a^3$.

Referring now to Figs. 8 and 9, the sole-plate $c$ is formed with two metal tongues $c^4$ which are pressed out from the metal of the plate leaving them joining into the plate near the ends thereof but divided from one another at the middle of the plate. These tongues are somewhat flexible and tend to press out the middle of the covering material $c^1$ notwithstanding that the main portion of the sole-plate lies closely against the rim A.

Referring now to Fig. 10, G is a spring within a socket $G^1$ which projects from the inner surface of the rim A. This spring normally tends to press out the middle of the covering material $c^1$; but to limit the extent to which this can take place, and to enable the spring to be drawn in sufficiently to allow the sole-plate $c$ to be slipped into place, a pin $g$, having a flat round head $g^2$ which comes against the outer end of the spring, passes through the socket and out through the inner end thereof and is provided with a nut $g^1$ on its end which projects at the back of the socket.

The invention substantially as above described, modified if desired to suit circumstances, is applicable also, as will be understood, to friction clutches generally of the conical type, whether for the purpose of renewing the wearing surface while one clutch member is partially within the other or not, and the means by which the sections may be adapted to gradually yield at their operative surfaces, and the means of limiting the extent to which such surfaces can be sprung or pressed out, and the means of fixing the sections in place, are all, substantially as described, useful for general application to this type of clutch.

It will now be obvious that the invention is capable of considerable modification; and that the sections may be applied to the outer rim, instead of to the inner, in the manner substantially in which they have been described, according to the different modifications, as applied to the inner rim.

The nature of the invention will now be readily understood without need for further description or illustration.

Having thus described my invention, I claim:—

1. In a friction clutch of the conical type, a clutch member, a second clutch member movable axially in relation to said first named clutch member and adapted when moved in one direction to make frictional contact with such other member and when moved in the opposite direction to release such other member, and a plurality of devices located between said clutch members and adapted to constitute a friction or wearing surface, and securing means adapted to removably secure said devices to one of the clutch members.

2. In a friction clutch of the conical type, a clutch member, a second clutch member movable axially in relation to said first named clutch member and adapted when moved in one direction to make frictional contact with such other member and when moved in the opposite direction to release such other member, a plurality of devices located between said clutch members and adapted to constitute a friction or wearing surface, and securing means adapted to removably secure said devices to one of the clutch members, said devices each comprising a plate of uniform thickness throughout provided with an outer facing of comparatively soft wearing material.

3. In a friction clutch of the conical type, a clutch member, a second clutch member movable axially in relation to said first named clutch member and adapted when moved in one direction to make frictional contact with such other member and when moved in the opposite direction to release such other member, a plurality of devices located between said clutch members and adapted to constitute a friction or wearing surface, and securing means adapted to removably secure said devices to one of the clutch members, said devices comprising plates each provided with an outer facing of comparatively soft material, and said clutch member to which the plates are secured having transverse guides along which said plates may slide.

4. In a friction clutch of the conical type, the combination with an outer clutch member, and an inner clutch member, one of said members being provided with transverse grooves; of a plurality of devices each comprising a plate provided with an outer surface of comparatively soft material adapted to constitute a friction or wearing surface; the ends of such plates being adapted to slide into the said transverse grooves of said clutch member.

5. In a friction clutch of the conical type, the combination with an outer clutch member, and an inner clutch member, one of said members being provided with transverse grooves; of a plurality of devices each comprising a plate provided with an outer surface of comparatively soft material adapted to constitute a friction or wearing surface, said plate being adapted to spring outward at its middle portion; and means for securing each of said plates to a clutch member.

6. In a friction clutch of the conical type, the combination with an outer clutch member, and an inner clutch member, of a plurality of devices each comprising a plate of which the outer surface constitutes a friction or wearing surface, said plate being adapted to spring outward at its middle portion; and means for securing each of said plates to a clutch member, said means comprising bolts projecting from each of said plates, slots in said clutch member adapted to receive said bolts sidewise, and nuts on said bolts.

7. In a friction clutch of the conical type, the combination with an outer clutch member, and an inner clutch member, of a plurality of devices each comprising a plate provided with an outer surface of comparatively soft material adapted to constitute a friction or wearing surface, and means for securing each of said plates to a clutch member, said means comprising bolts projecting from each of said plates, slots in such clutch member adapted to receive said bolts sidewise, nuts on said bolts, recesses in said clutch member and ring-like structures which surround the bolts and are moved as the nuts are screwed up into said recesses and secure the bolts against moving sidewise within said bolts.

8. In a friction clutch of the conical type, the combination with an outer clutch member, and an inner clutch member, of a plurality of devices each comprising a plate provided with an outer surface of comparatively soft material adapted to constitute a friction or wearing surface, said plate being adapted to spring outward at its middle portion; and means for securing each of said plates to a clutch member.

In witness whereof I have hereunto signed my name this 18th day of May 1909, in the presence of two subscribing witnesses.

HERBERT AUSTIN.

Witnesses:
ERNEST HARKER,
ROBERT G. GROVES.